United States Patent [19]

Bellas et al.

[11] 4,092,809

[45] June 6, 1978

[54] DOMED ROOF STRUCTURES FOR EASY ASSEMBLY AND DISMANTLING

[76] Inventors: Frederic Edward Bellas, 148 Zerbey Ave., Edwardsville; Robert Anthony Decker, 204 Shoemaker St., Swoyersville, both of Pa. 18704

[21] Appl. No.: 716,143

[22] Filed: Aug. 20, 1976

[51] Int. Cl.$^2$ ............................................. E04B 1/347
[52] U.S. Cl. .......................................... 52/63; 52/86; 135/3 R; 52/80
[58] Field of Search .................... 52/80, 81, 63, 86; 135/3 R; 24/174, 178 R, 178 FC, 178 A, 188, 193, 191; 4/172.12

[56] References Cited

U.S. PATENT DOCUMENTS

| | | | |
|---|---|---|---|
| 613,902 | 11/1898 | Grace | 24/178 R |
| 658,124 | 9/1900 | Semple | 24/178 R |
| 1,253,776 | 1/1918 | Brewer | 135/3 R |
| 3,002,590 | 10/1961 | Hannoosh | 52/81 |
| 3,155,987 | 11/1964 | McGill | 24/178 R |
| 3,380,203 | 4/1968 | Peterschmidt | 52/81 |
| 3,534,412 | 10/1970 | Crook | 4/172.12 |
| 3,683,427 | 4/1972 | Burkholz | 52/80 |
| 3,744,500 | 7/1923 | Briggs | 135/3 R |
| 3,766,573 | 10/1973 | Burkholz | 135/3 R |

FOREIGN PATENT DOCUMENTS

| | | | |
|---|---|---|---|
| 1,016,277 | 11/1952 | France | 135/3 R |
| 23,666 | 8/1913 | Norway | 52/111 |

*Primary Examiner*—Ernest R. Purser
*Assistant Examiner*—Henry Raduazo
*Attorney, Agent, or Firm*—Albert F. Maier, Jr.

[57] ABSTRACT

Domed roof structures comprising a frame and covering to provide easily assembled and dismantled enclosures for uses such as swimming pool covers, garages, greenhouses, patio covers, sheds, tents and the like wherein a skeletal framework mounted on the outer periphery of the area to be enclosed, is covered by a flexible cover drawn taut thereover and buckled thereto. Embodiments to cover a wide variety of shapes of enclosures are provided.

14 Claims, 15 Drawing Figures

DOMED ROOF STRUCTURES FOR EASY ASSEMBLY AND DISMANTLING

BACKGROUND OF INVENTION

1. Field of the Invention

The present invention pertains to dome-like roof structures that can be assembled and dismantled easily while providing a stable dome when erected. More particularly, it pertains to structures which can provide inexpensive cover for such applications as swimming pools, both above and in the ground, greenhouses, garages, patios, sheds, tents and the like; said cover being easily removable when the need to do so arises.

2. The Prior Art

While it is desirable to provide an inexpensive lightweight cover for enclosing such things as swimming pools, greenhouses, garages, patios, sheds, tents and the like, the prior art has dwelt upon structures that in particular provide a structure to cover outdoor swimming pools.

With reference to pools, covers are desirable in the winter months to avoid cracking of pool walls and to keep the pools free of leaves, trash and other undesirable debris.

Conventional pool covers consist of heavy tarpaulins or heavy gauge plastic sheeting stretched taut over the surface of the pool and anchored to the coping by means of eyehooks or other devises.

U.S. Pat. No. 3,534,412 issued to H. B. Crook, Oct. 20, 1970, discloses a pool cover which includes a center support member which consists of short lengths of pipe coupled by means of four-way fittings. Side supports are bowed or arched lengths of flexible pipe jointed to the center support by ways of the four-way fittings. The ends of the side support members are attached to the pool coping by means of a three-fingered anchoring devise having an upturned center finger inserted in the end of the respective side support pipes and having two downturned finger portions to engage a coping or the edge of the pool. The flexible cover is drawn taut over the frame and retained in place by weights or sandbags.

Although this patent is an improvement over a flat tarpaulin, it still does not readily adapt to above-ground pools and does not provide for forming an enclosure where no coping exists, such as in the case of a garage, shed, greenhouse, patio or the like. Further, this patent does not disclose an above-ground enclosure which encloses a usable space when erected, such as a garage, shed or greenhouse.

U.S. Pat. No. 3,855,643, issued to Sandford et al, issued Dec. 24, 1974, discloses a swimming pool cover having a skeleton frame with a longitudinal ridge pole and downwardly curving rafters anchored to pins along the sides of the pool; however, this structure would have limited success in application to above-ground pools and would hardly serve usefully for a garage, shed or patio cover.

U.S. Pat. No. 3,683,427, issued to Burkholz et al, issued Aug. 15, 1972, pertans to removable domes for outdoor swimming pools to protect swimmers from the weather. The structure consists of a lightweight metal pipe frame structure extending upwardly from the top rail of the swimming pool to a central connecting member or spider. A flexible sheet is placed over the framework and the sheet is such that it forms a dome over the pool. The framework is supported by brackets mounted about the top rail of the pool. The brackets are screwed fixedly to the rail and the fabric is held down by a grommet-s-hook combination. The s-hook engage the grommets on the fabric on either side at a bracket and the s-hooks are connected with a resilient strap which is slipped under a hook also mounted on the side of the pool.

With such a structure, application to other than an above-ground pool would require serious modification. Also, the structure is not designed to accommodate other than circular or regular polygonal structures.

U.S. Pat. No. 3,766,573, also issued to Burkholz et al, expands their prior disclosure to enclose regular oval structures, having regular polygonal ends, where a ridge pole or longitudinal rafter must be used.

This structure also would require serious modification to be used in other than above-ground swimming pool applications. Also the structure is limited to regular oval shapes.

Therefore, it is an object of this invention to provide easily erected and dismantled domed roof structures which can provide protection for above and in-ground swimming pools as well as provide easily erectable enclosures for a variety of uses such as garages, greenhouses, patios, sheds, tents and the like.

SUMMARY OF THE INVENTION

The present invention provides for inexpensive lightweight dome-like roof structures, of pleasing geometric shapes and of esthetic quality; that can be easily assembled without the use of any tools for use during certain seasons of the year, if so desired, and dismantled and stored during others. One of the geometric shapes of the domed roof structures is a portion of a spherical surface, and for certain other cases a portion of a cylindrical surface that fits smoothly with portions of spherical sections at its ends, or straight-frame variations of these.

Application of such domed roof structures as these and their straightforward logical extensions will be made to the following structures: above-ground and in-ground swimming pools of circular and regular polygonal and oval shapes; home-garden and commercial greenhouses; garages; storage sheds and warehouses; patios; tents; and others. By regular polygonal is meant polygons of equal length sides and equal angles; and by oval is meant of two long parallel sides with either semi-circular or semi-regular polygonal ends.

The typical domed roof structure consists of the following parts: the domeplate, which occupies the apex, or top, of the domed roof structure; the interlocking rafter- or rib-sections, which join to and extend from the domeplate to the base; the base- or seat-plates, into which the lowest ribs are locked, and which themselves are mounted onto the base, or seat of the structure to be covered; the ridge-plate and ridge-sections, which are used to extend along the length of oval structures; and the cover, of lightweight durable material such as canvas, rubber, nylon, fiberglass, polyethylene, vinyls, and other suitable materials.

When erected, as will be shown more completely in the description of the drawings and the preferred embodiment to follow, the dome plate occupies the apex in circular or regular polygonal structures and the upper ends of a plurality of rib sections interlock with said dome plate, the rib sections extending downwardly and in an arc to the base of the structure where the lower ends interlock with a series of base plates positioned around the outer border of the area to be covered by the structure. Said interlocking rib sections are rectangular in cross-section to ensure rigidity along the length, perpendicular to the length, and against twisting and turning and provide a skeleton upon which a cover can be placed to complete the structure.

More precise explanation of the cooperation between the various elements of the structure along with the preferred design of each can be more readily had by reviewing the Description of the Drawings and preferred embodiment which follows.

THE DRAWINGS

FIG. 10 shows the spacial relationship of the elements of the invention for enclosing an oval structure with semi-circular ends. Here, a pair of dome plates is employed, one above each end, jointed by a series of horizontal ridge-sections. Each dome plate here is similar to the full dome plate, except that some of the arms are now superfluous and have been removed when manufactured.

FIG. 11 shows a few possible logical extensions or modifications of rib sections and dome plates.

THE PREFERRED EMBODIMENT

In order to demonstrate the possible use of this invention, roof enclosures for two types of swimming pool shapes will be described by use of the drawings.

Figure 1:
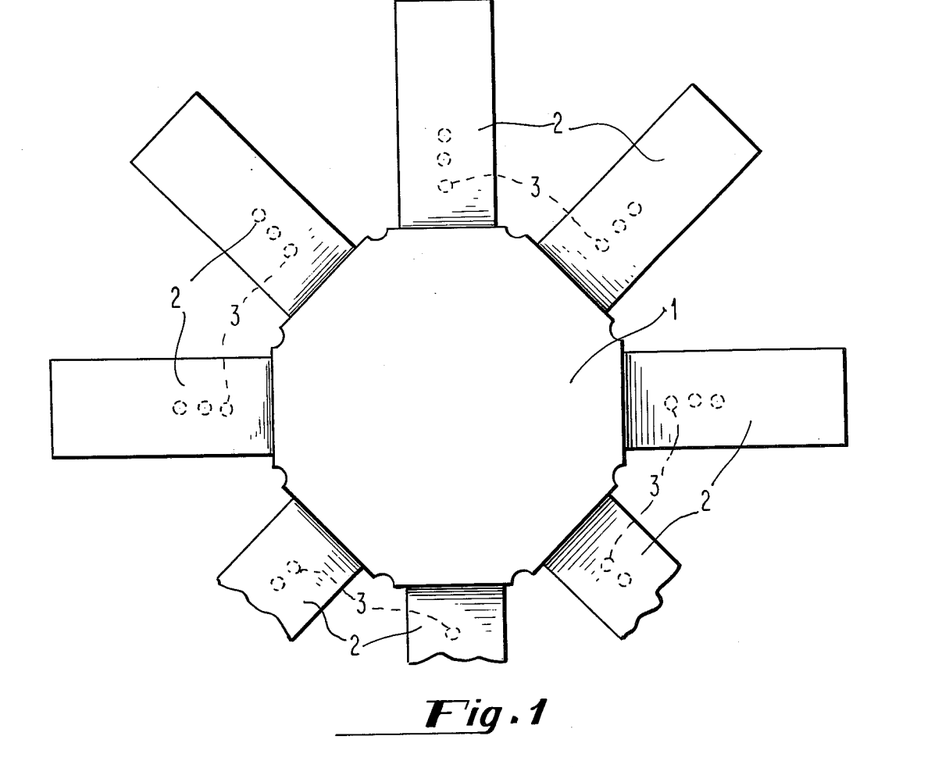
FIG. 1 shows the full dome plate structure, top view, for use with circular and regular polygonal structures. For use with other structures, certain ones of the arms are deleted when maufactured.

FIG. 1 shows a full dome plate which comprises a center section 1 and a plurality of arms with tenons or male connectors, 2. Such a dome plate is used for swimming pools that are circular or regular polygonal in shape. In this embodiment the arms and tenons are eight in number. The entire dome plate lies along a section of a sphere of precalculated radius of curvature $R_c$ as determined by the following derived equation:

(1) $R_c = (D^2 + 4h^2)/8h$, where D is the diameter of the circular or regular-polygonal or width of the oval structure, $h$ is the height of the dome plate above the seat of the structure.

Figure 2:
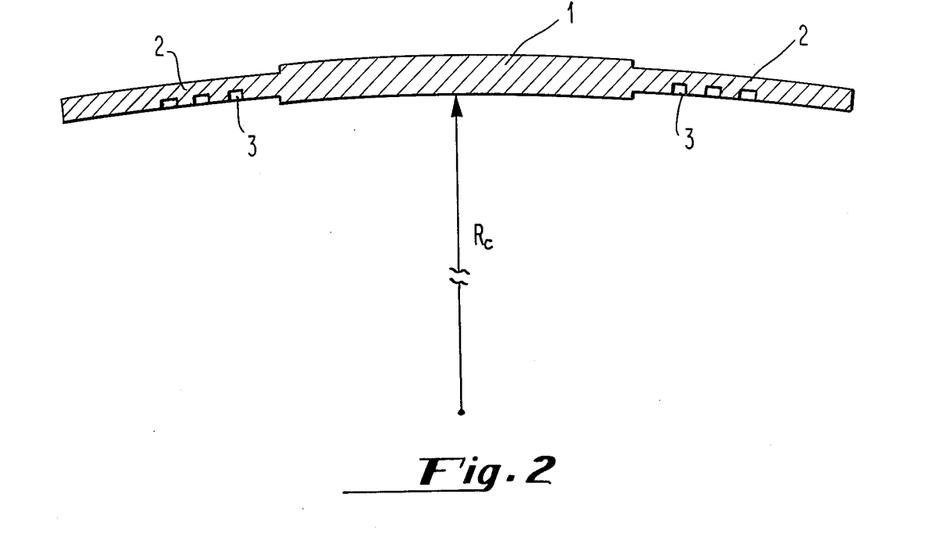
FIG. 2 shows the dome plate structure from a side cross-sectional view.
Figure 2:
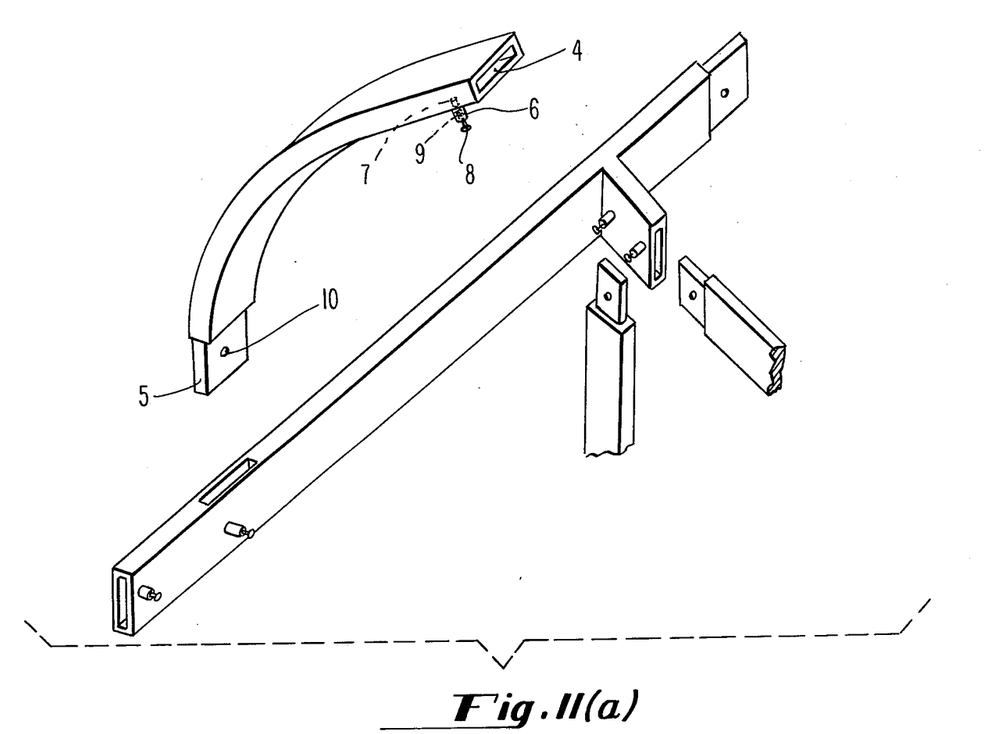

FIG. 2 shows a cross-sectional view of the dome plate showing its arced disposition. Each tenon of the dome plate has a notch, 3, or a longitudinal series of such notches, defined within its body for interlocking with the top rib sections.

Figure 3:
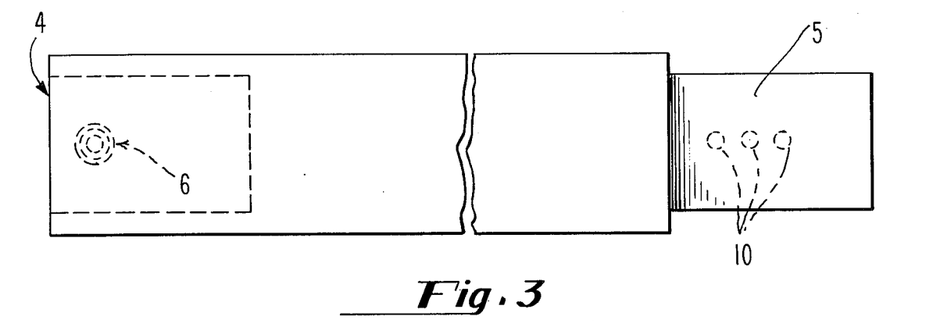
FIGS. 3 and 4 show the rib-section, top and side views.
Figure 4:
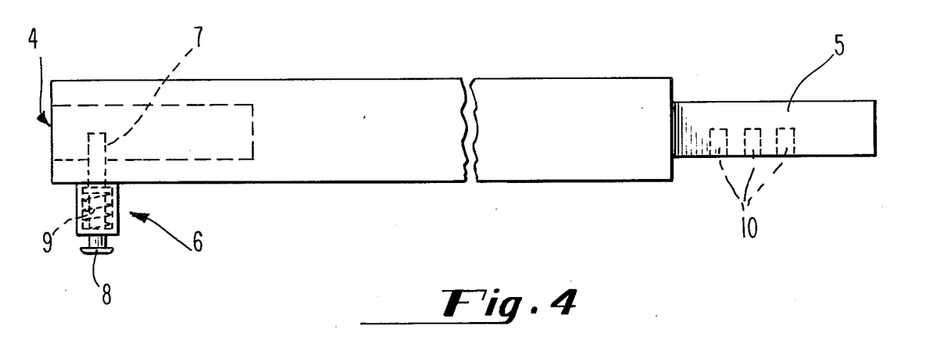
Figure 5:
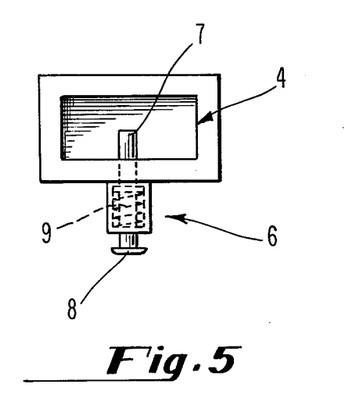
FIGS. 5 and 6 show the female and male end cross-sections of said rib section.
Figure 6:
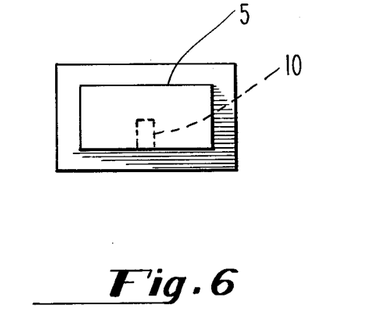

FIG. 3 shows the rib section which can be made from light-weight metals, certain plastics, fiberglass, laminated woods, and the like. The rib sections are of a rectangular cross-section to provide maximum rigidity, with one end comprising a female coupling or mortises, 4, and the other end comprising a male coupling or tenon, 5, The mortise further comprises a spring-loaded cartridge, 6, which has a protruding locking bolt, 7, which will be of a size accomodatingly smaller than notch, 3, and of a cross-sectional configuration similar to notch 3 so that the tenons 2 and 5 will, upon insertion into the mortises 4, form a series of rib connections, held in place by the engagement of bolts 7 into notches 3 and 10. Note also that more than one notch can be provided in tenon 2 as in tenon 5, to make the structure more adjustable to insure a final firm fit, especially with regular polygonal shapes, even though the rib sections will be manufactured in different lengths.

The spring-loaded bolt 7 can be retracted via knob 8 to disengage it from notch 3 in the disassembling of the structure, the pulling on knob 8 resulting in the compression of spring 9 and the retraction of bolt 7.

The rib section further comprises male end tenon 5 wherein notches 10 are bored. These notches are compatible with all the female coupling, such as mortise 4 and on the seat plate to be discussed later.

It should be noted that the rib sections are of a rectangular cross-sectional configuration so as to lend rigidity to the entire structure against load compression as from snow and cover weight, and twisting and rotational torques as from high winds.

Further, the rib sections can be manufactured straight so that their precalculated length will be such that they will assume the precalculated curvature $R_c$ after having been interlocked to the dome plate above and to the base plate below. Said length can be calculated as follows:

$$L = 2R_c \arctan(4hD/(D^2 - 4h^2)) \quad (2)$$

$h' = (D'/D) h,$ where:

D is the diameter of the circular structure or width of the oval structure that is to be fitted by the domed roof structure; $h$ is the height that the dome plate rises above the seat of the structure; L is the length of arc of the domed roof structure from seat plate, along the ribs, over the dome plate and back down the other rib to the seat plate on the opposite side. The last equation insists that symmetry and proportion will be preserved so that a larger domed roof structure will look like a geometric magnification of a smaller one, thus preserving the esthetic quality.

Naturally, in such an application these rib sections would have to be rigid yet somewhat flexible.

If on the other hand the composition of the rib sections is such that they are completely rigid, as in the case of metal ribs, then they will have to be manufactured with the correct curvature $R_c$.

If it is desired to have the domed roof structure as a permanent year-round structure rather than a seasonal one, implying that the domed roof structure will not be dismantled and stored, then the tenons will have been manufactured with the three holds tapped entirely through, and the spring-cartridge locking devises deleted and the remaining holes also tapped entirely through in order that bolts and nuts in the case of plastics, fiberglass and laminated woods, or rivets, in the case of metals, can be used for permanent interlocking.

The type of base or seat upon which the domed roof structures will sit and be mounted will vary from one structure to the next. For example, in the case of commercially built above-ground swimming pools, the cross-sectional profiles of metal seats available on the market are such that the seat plate shown in FIG. 7 will fit them snuggly. In the case of wooden garages and sheds, the seat may consist of a pair of two-by-tens as a front header and a pair of two-by-fours on each of the remaining three sides; for cinder and concrete block garages and sheds, the seat may consist of two-by-eights along the entire top row of blocks. With slight modifications made when manufactured, the seat plate shown in FIG. 7 will also fit these cases.

Figure 7A:
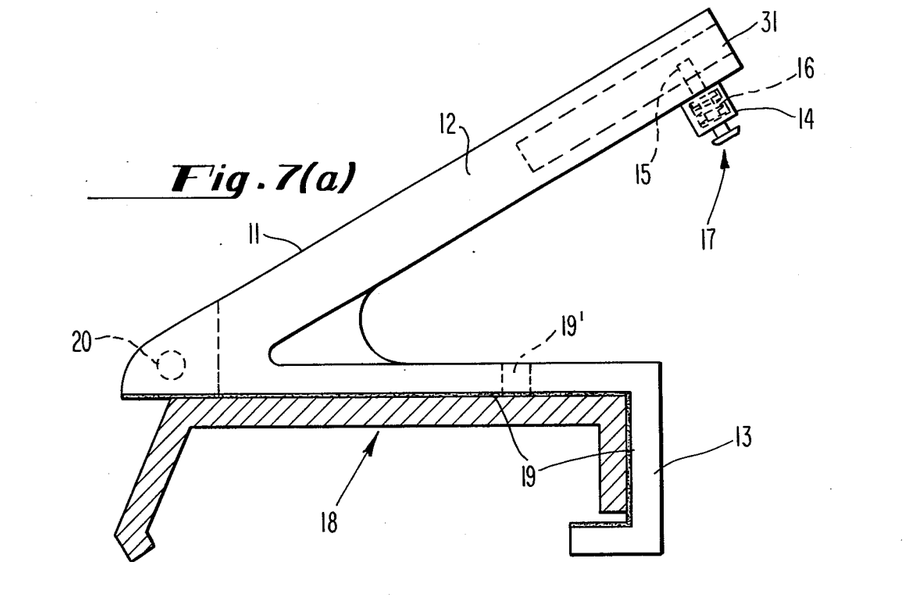
FIG. 7 shows the seat plate from two views:
7-a, side cross-section
7-b, back oblique view
Figure 7B:
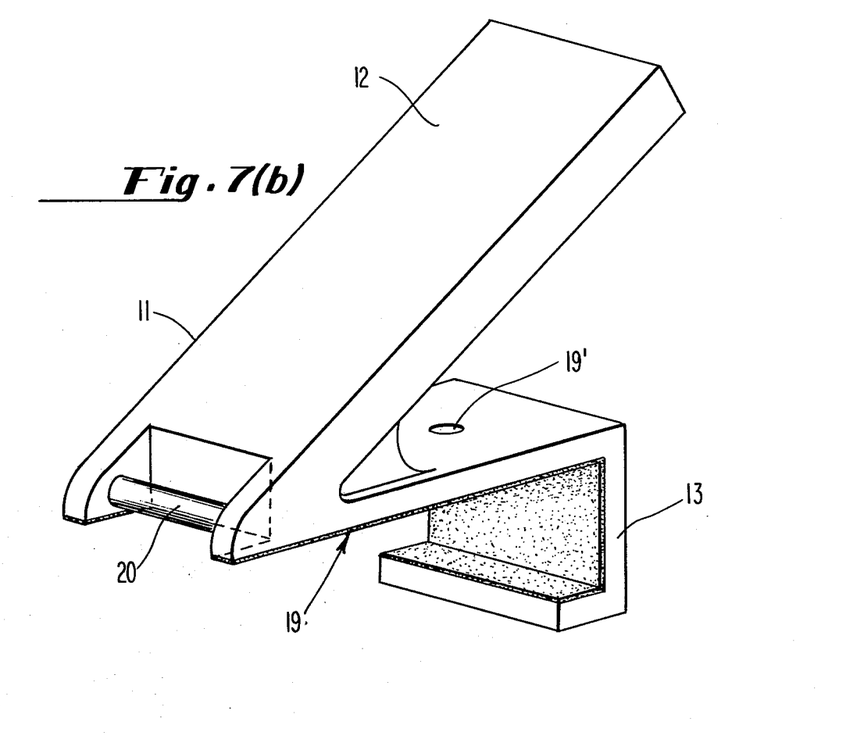

FIG. 7 shows the seat plate with a cross-section arranged to fit a family of particular seat profiles, such as those available with commercially built above-ground swimming pools. For these, the outside of a seat plate is held down by the buckle shown in FIG. 8.

The seat plate comprises a main body, 11, which has an upper section, 12, and an L-shaped lower section, 13. The upper section further comprises a female coupling or mortise, 31, which receives the male coupling or tenon, 5 on the lowest rib section. Locking bolt cartridge 14 is provided with bolt 15, spring 16 and knob 17 to engage notches 10 in tenon 5 to form a firm coupling between the rib section and the seat plate. Due to the overall configuration, any weight of the rib sections such as from the cover and snow will be transferred downwardly and outwardly causing a snug fit between the lower section 13 at the seat plate and the seat 18 of the structure to be covered. The underside 19 of the seat plate can be coated with rubber or another material to lessen undue rubbing between the seat plate and the seat, such as would be desirable if the cover was used and removed from a swimming pool, so that the seat would not be marred. A rod 20 is provided for fastening the seat plate to the seat with the belt that is part of the buckle.

Figure 8:
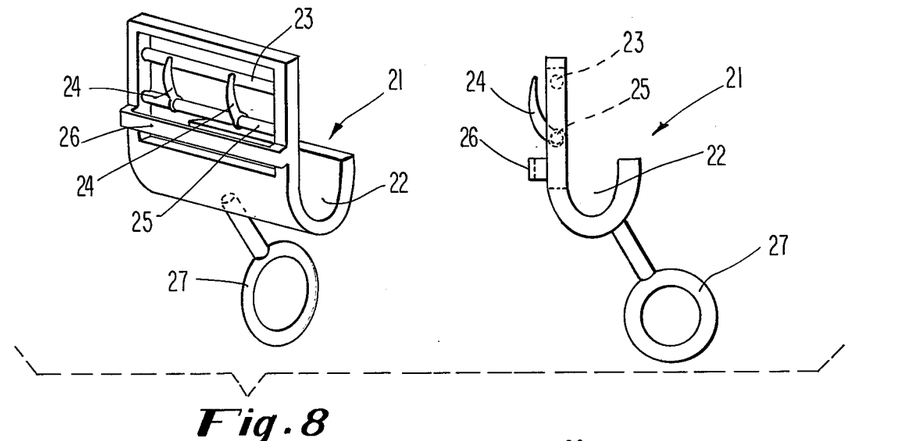
FIG. 8 shows the buckle from a back oblique view and a side view.

The buckle 21 contains: a U-shaped trough, 22, for mounting on the underside lip of the commercial seat profiles and which can be coated with rubber or another material to prevent marring of the seat; a rod, 23, against which the belt is drawn taut and tightened; a pair of spiked tongues, 24, that hold the belt and are hinged on a rod, 25; a guide-clasp, 26, for gathering in the remainder of the belt; and a circular eye-bolt, 27, use of which will be described later in connection with the cover.

Figure 12:
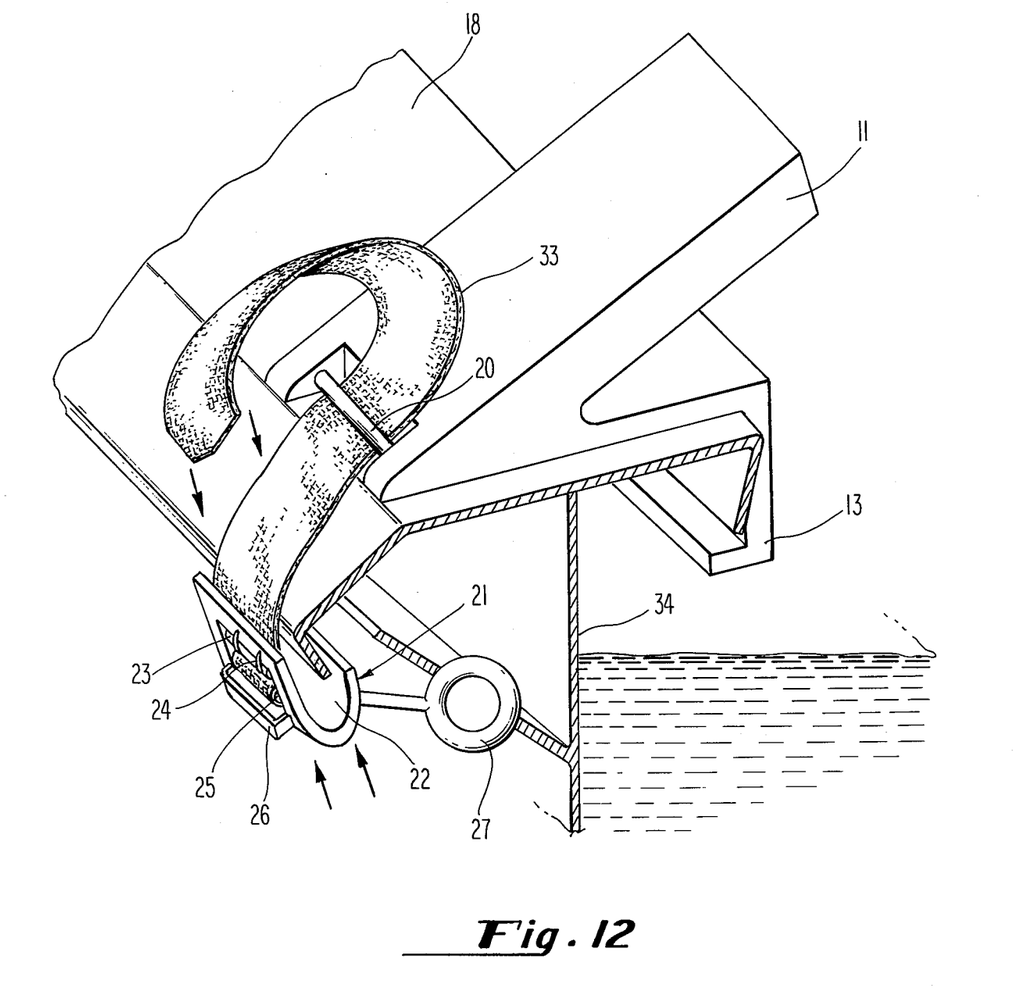
FIG. 12 shows the buckling procedure.

The buckling proceeds in the following manner: One end of the short belt is wrapped around rod 25 and fastened there by stitching or riveting. The other end of the belt is passed under rod 23, taken up to the seat plate above, then under and over rod 20, and is returned to the underside of rod 23, where it is drawn taut and then held by the spiked tongues 24. The remainder of the belt is passed through the guide-clasp 26 for neat retaining.

Figure 9:
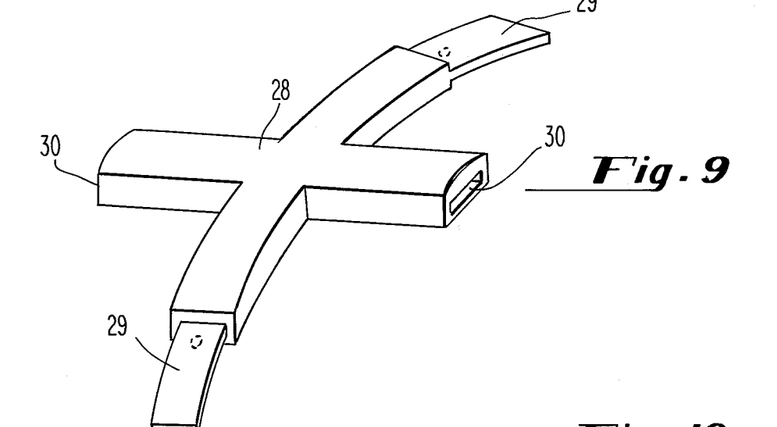
FIG. 9 shows the ridge plate.
Figure 10:
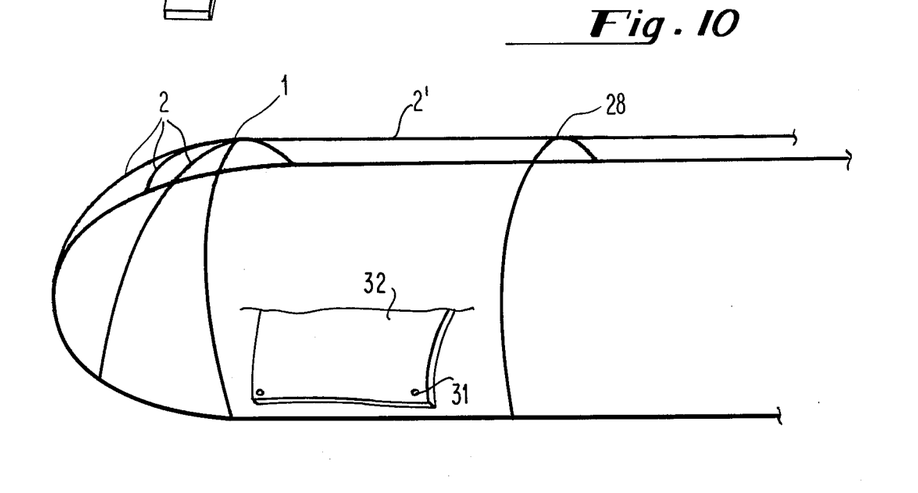

For utilization in oval structures, modification is made to the design of the dome plate. As shown in FIG. 10, a modified dome plate 1 is located on each semi-circular end of the oval structure. Five downward curved tenons 2 are used as in the earliest embodiment, two tenons are removed, and one tenon 2' is horizontal so that the rib section attached thereto will be horizontal as well. This horizontal rib section, now known as a ridge section, has the same tenon-mortise configuration disclosed in FIG. 3 except that its tenon now engages ridge plate 28 shown in FIG. 9. Each ridge plate comprises two tenons 29 and two mortise portions 30 so that it can be connected to the ridge section via that mortise 30 and tenon 5 and supported to a base plate via a rib section or series of rib sections similar to those engaging the dome plate. In this way, many shapes and sizes of enclosures can be provided for with the basic structural parts. Further, joists and trusses can be added in the same mortise-tenon fashion to add strength to the structure especially in permanent applications.

A few examples of other numerous shapes utilizing modified rib sections and dome plates are shown in FIG. 11. A curved eave rib section arrangement is shown in FIG. 11(a); an A-frame dome plate is shown in FIG. 11(b); and a circular-frame dome plate for use with cylindrical-like roofs to fit rectangular structures is shown in FIG. 11(c). These types can also be applied to garages, greenhouses, barns, sheds, patios, tents, swimming pools and other enclosures.

Covers of lightweight durable materials are available on the market. For a spherical-like or cylindrical-like domed roof structure which is to be used and stored seasonably, heavy gauge plastics are ideal. For this case, and for others such as canvas, for example, holes and heavy-duty grommets No. 31 are used near the bottom circular edge of the cover, No. 32 with the grommeted holes being passed over each circular eye-bolt 27 that is located at the bottom of each buckle, as shown in FIG. 8. A rope is then passed through each eye-bolt around the entire base and tightened, thereby providing a good tight fit against windy conditions.

For a domed roof structure which is to be used with below-ground swimming pools, for example, the buckle 21 is not used; instead, an eye-bolt 27 like that molded to the buckle is now molded to the back end of the seat plate, and the grommeted holes now fit over these and are secured by a rope in similar fashion as above. A vertical hole 19' is bored through the horizontal portion so that a threaded bolt can fasten the seat plate to the seat of the below-ground pool, which also has threaded holes bored into it. In addition, the small horizontal lip of the L-shaped bottom section 13 is now superfluous and is removed.

From the foregoing detailed description of the illustrative embodiments of the invention, it will be apparent that there have been provided improved easily assembled-disassembled domed roof structures and, although these embodiments have been described in detail for the purpose of showing operative structures, where the use of the invention may be readily comprehended, it is to be understood that the particular structures are intended to be illustrative only and that the various novel characteristics of the invention may be incorporated in other forms without departing from the spirit and scope of the invention as defined in the claims.

We claim:

1. A domed roof structure to enclose an area, the outer periphery of said area defined by a base, comprising:
   a. a dome plate having a central body and a plurality of dome tenons protruding radially therefrom, each dome tenon having a rectangular cross-section,
   b. a plurality of rib sections, being generally rectangular in cross-section, each having a rib mortise on one end and a rib tenon on the other end,
   c. means for coupling said dome tenons fixedly to said rib mortises comprising a series of longitudinally spaced notches defined in said dome tenons and a spring loaded coupler mounted on said rib section which comprises a locking bolt of a size accommodatingly smaller than said notches, a spring placed circumferentially around said locking bolt and a cartridge to accommodate said locking bolt and spring whereby said dome tenon is inserted into said rib mortise, said locking bolt is retracted, thereby compressing said spring, one of said notches is lined up with said locking bolt and said locking bolt is inserted into said notch to form a firm coupling, d. a plurality of seat plates mounted on said base, each seat plate comprising an upturned top section having a seat mortise having a generally retangular cross section, lower horizontal section and a lower vertical section, e. means for mounting said lower horizontal section of said seat plate on said base, f. means for coupling said rib tenons to said seat mortises thereby forming a skeletal framework of the domed roof structure, comprising a series of longitudinally spaced notches defined in said rib tenon and a spring loaded coupler mounted on said seat mortise which comprises a locking bolt of a size accommodatingly smaller than said notches, a spring placed circumferentially around said locking bolt and a cartridge to accommodate said locking bolt and spring whereby said rib tenon is retracted thereby compressing said spring, one of said notches is lined up with said locking bolt and said locking bolt is inserted into said notch to form a firm coupling, g. a cover drawn over said skeletal framework to enclose the area desired and, h. means for anchoring said cover to said domed roof structure.

2. The structure of claim 1 wherein said seat plate further comprises, a. a lower horizontal section having a horizontal body which traverses the base and a perpendicular L-shaped downward end which cooperates with the edge of the base facing the area enclosed so that downward and outward stresses are counteracted, b. a coating of flexible material along the edge of said lower horizontal section which cooperates with the base so as to protect said base from marring and, c. a lateral cylindrical rod mounted on the outer edge of said seat plate around which a belt may be drawn.

3. The structure of claim 2 wherein said means for anchoring said cover to said domed roof structure comprises, a. a buckle having a U-shaped body wherein one leg of said U is essentially longer than the other, b. a generally rectangular passageway defined by the sides and upper end of said longer leg, c. a first cylindrical rod mounted on said longer leg and traversing said passageway, d. a second cylindrical rod mounted on said longer leg and traversing said passageway at a location essentially below the location of said first cylindrical rod, e. a strap mounted on said second cylindrical rod, f. more than one perpendicular tooth attached fixedly to said second cylindrical rod, g. a clasp mounted on said longer leg accommodatingly wider than said strap, h. an eye bolt mounted on the lower end of said U-shape buckle and at an acute angle with a line parallel to the legs of said buckle so as to provide a tucking in of said cover, i. a series of grommets fastened to the lower edge of said cover accommodatingly larger than said eye bolts, j. a coating of flexible material along the face of said U-shaped buckle which cooperates with said base whereby said shorter leg engages the outer edge of the base without marring its surface, the strap is passed under the first lateral cylindrical rod, passed around the lateral cylindrical rod on said seat plate, passed under the first lateral cylindrical rod and between said first and second lateral cylindrical rods, drawn taut, and engaged by said perpendicular teeth, the excess passed through said clasp for neat retention and whereby said eye bolts are passed through said grommets to complete the structure.

4. The structure of claim 3 wherein said cover is selected from the group of materials consisting of canvas, rubber, nylon, fiberglass, polyethylene and the like.

5. The structure of claim 3 wherein said rib sections are flexible and are readily bent to form an arc of precalculated radius.

6. The structure of claim 3 wherein said rib sections are rigid and form an arc of precalculated radius.

7. The structure of claim 3 wherein said base is selected from the group consisting of, the upper edge of above ground swimming pools, the coping of in-ground swimming pools and a wooden beam.

8. A domed roof structure to enclose an area, the outer periphery of said area defined by a base, comprising:

a. two or more dome plates, each having a central body and a plurality of first dome tenons protruding radially therefrom, each dome tenon having a rectangular cross section and each dome plate having at least one second horizontal dome tenon, b. a plurality of ridge plates each having two ridge plate tenons and two ridge plate mortises essentially perpendicular to said ridge plate tenons, c. a plurality of ribs consisting of rib sections generally rectangular in cross section each having a rib mortise on one end and a rib tenon on the other end said plurality being a number equal to the sum of said first dome tenons plus said ridge tenons, d. a plurality of ridge sections being of generally rectangular cross sections each having a ridge mortise on one end and a ridge tenon on the other end, e. means for coupling said second horizontal dome tenons fixedly to said ridge mortises comprising a series of longitudinally spaced notches in said dome tenons and spring loaded coupler mounted on said rib mortise, said coupler comprising locking bolts of a size accommodatingly smaller than said notches, a spring placed circumferentially around said locking bolt and cartridge to accommodate said locking bolt and spring whereby said second horizontal dome tenons are inserted into said rib mortises, said locking bolts are retracted thereby comprising said spring, one of said notches is lined up with said locking bolt and said locking bolt is inserted into said notch to form a firm coupling.

g. means for coupling said remaining rib mortises fixedly to said ridge plate tenons, comprising a series of longitudinally spaced notches in said ridge tenons and spring loaded couplers mounted on said rib mortise said coupler comprising locking bolts of a size accommodatingly smaller than said notches, a spring placed circumferentially around said locking bolt and cartridge to accommodate said locking bolt and spring, whereby said ridge tenons are inserted into said rib mortises said locking bolts are retracted thereby compressing said spring, one of said notches in said ridge tenons is lined up with said bolt and said locking bolts are inserted into said notches to form a firm coupling, h. means for coupling said ridge plate mortises fixedly to said ridge tenons comprising a series of longitudinally spaced notches in said ridge tenons and spring loaded couplers mounted on said ridge plate mortises said coupler comprising locking bolts of a size accommodatingly smaller than said notches, a spring placed circumferentially around said locking bolt and cartridge to accommodate said locking bolt and spring, whereby said ridge tenons are inserted into said ridge plate mortises said locking bolts are retracted thereby compressing said spring, one of said notches is lined up with said bolt and said locking bolts are inserted into said notches to form a firm coupling, i. a plurality of seat plates mounted on said base, each seat plate comprising an upturned top section having a seat mortise having a generally rectangular cross section and a lower horizontal section, j. means for mounting said lower horizontal section of said seat plate on said base, k. means for coupling said rib tenons to said seat mortises thereby forming a skeletal framework of the domed roof structure comprising a series of longitudinally spaced notches defined in said rib tenon and a spring loaded coupler mounted on said seat mortise which comprises a locking bolt of a size accommodatingly smaller than said notches, a spring placed circumferentially around said locking bolt and cartridge to accommodate said locking bolt and spring whereby said rib tenon is inserted into said seat mortise, said locking bolt is retracted thereby compressing said spring, one of said notches is lined up with said locking bolt and said locking bolt is inserted into said notch to form a firm coupling, l. a cover drawn over said skeletal framework to enclose the area desired and, m. means for anchoring said cover to said domed roof structure.

9. The structure of claim 8 wherein said seat plate further comprises, a. a lower horizontal section having a horizontal body which traverses the base and a perpendicular L-shaped downward end which cooperates with the edge of the base facing the area enclosed so that downward and outward stresses are counteracted, and upward stresses are counteracted.

b. a coating of flexible material along the edge of said lower horizontal section which cooperates with the base so as to protect said base from marring and    c. a lateral cylindrical rod mounted on the outer edge of said seat plate around which a belt may be drawn.

10. The structure of claim 9 wherein said means for anchoring said cover to said domed roof structure comprises    a. a buckle having a U-shaped body wherein one leg of said U is essentially longer than the other,    b. a generally rectangular passageway defined by the side and upper end of said longer leg,    c. a first cylindrical rod mounted on said longer leg traversing said passageway,    d. a second cylindrical rod mounted on said longer leg and traversing said passageway at a location essentially below the location of said first cylindrical rod,    e. a strap mounted on said second cylindrical rod,    f. more than one perpendicular tooth attached fixedly to said second cylindrical rod,    g. a clasp mounted on said longer leg accomodatingly wider than said strap,    h. an eye bolt mounted on the lower end of said U-shaped buckle and at an acute angle with a line parallel to the legs of said buckle,    i. a series of grommets fastened to the lower edge of said flexible cover accommodatingly larger than said eye bolts,    j. a coating of flexible material along the face of said U-shaped buckle which cooperates with said base whereby said shorter leg engages the outer edge of the base without marring its surface, the strap is passed under the first lateral cylindrical rod, passed around the lateral cylindrical rod on said seat plate, passed under the first lateral cylindrical rod and between said first and second lateral cylindrical rods, drawn taut, and engaged by said perpendicular teeth, the excess passed through said clasp for neat retention and whereby said eye bolts are passed through said grommets to complete the structure.

11. The structure of claim 9, wherein said cover is selected from the group of materials consisting of canvas, rubber, nylon, fiberglass, polyethylene and the like.

12. The structure of claim 9, wherein said rib sections are flexible and readily bent to form an arc of precalculated radius.

13. The structure of claim 9 wherein said rib sections are rigid and form an arc of precalculated radius.

14. The structure of claim 9, wherein said base is selected from the group consisting of, the upper edge of above-ground swimming pools, the coping of in-ground swimming pools and a wooden beam.

* * * * *